(12) United States Patent
Vanturennout et al.

(10) Patent No.: US 9,588,983 B2
(45) Date of Patent: Mar. 7, 2017

(54) DATA CLASSIFICATION FOR ADAPTIVE SYNCHRONIZATION

(71) Applicant: Microsoft Corporation, Redmond, WA (US)

(72) Inventors: Jeroen Vanturennout, Snohomish, WA (US); Jason Wadsworth, Bellevue, WA (US); Yuanquan Zhang, Seattle, WA (US); Ranjib Singh Badh, Sammamish, WA (US); Eyal Axelrod, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/056,883

(22) Filed: Oct. 17, 2013

(65) Prior Publication Data

US 2015/0112924 A1    Apr. 23, 2015

(51) Int. Cl.
*G06F 17/30* (2006.01)
*H04L 29/08* (2006.01)

(52) U.S. Cl.
CPC .... *G06F 17/30174* (2013.01); *H04L 67/1095* (2013.01); *H04L 67/322* (2013.01)

(58) Field of Classification Search
CPC ......... G06F 17/30174; G06F 17/30575; G06F 17/30578; G06F 17/30581; G06F 17/30176
USPC .......................................................... 707/610
See application file for complete search history.

(56) References Cited

U.S. PATENT DOCUMENTS

| 5,768,585 | A  |   | 6/1998  | Tetrick et al. |
| 5,781,775 | A  |   | 7/1998  | Ueno |
| 5,822,689 | A  |   | 10/1998 | Hwang |
| 6,601,076 | B1 | * | 7/2003  | McCaw et al. |
| 7,203,853 | B2 |   | 4/2007  | Martwick et al. |
| 7,594,017 | B1 |   | 9/2009  | DiValentino |
| 7,710,975 | B2 | * | 5/2010  | Commarford et al. .. 370/395.21 |
| 8,045,977 | B2 |   | 10/2011 | McGuffin |

(Continued)

FOREIGN PATENT DOCUMENTS

| EP | 2207328    |    | 7/2010 |
| EP | 2207328    | A1 | 7/2010 |

(Continued)

OTHER PUBLICATIONS

Kol, et al., "Adaptive Synchronization for Multi-Synchronous Systems", Retrieved at <<http://webee.technion.ac.il/people/ran/papers/KolGinosar/AdaptSyncICCD1998.pdf, Computer Methods in Applied Mechanics and Engineering, 1994, pp. 12.

(Continued)

*Primary Examiner* — Syed Hasan
*Assistant Examiner* — Saba Ahmed
(74) *Attorney, Agent, or Firm* — Anand Gupta; Tom Wong; Micky Minhas

(57) ABSTRACT

In one embodiment, a synchronization engine 116 of an application module 114 may adjust a synchronization scheme 306 based on the implicit data classification of a data item. A synchronization engine 116 may detect a user action 406 executed by a user on a data item 402. The synchronization engine 116 may determine an action type 408 for the user action 406. The synchronization engine 116 may assign an item synchronization priority to the data item 402 based on the action type 406.

20 Claims, 12 Drawing Sheets

(56) References Cited

U.S. PATENT DOCUMENTS

| | | | |
|---|---|---|---|
| 8,095,612 B2 | 1/2012 | Cowan et al. | |
| 8,312,096 B2* | 11/2012 | Cohen et al. | 709/207 |
| 8,407,306 B1 | 3/2013 | Nerieri et al. | |
| 2006/0155776 A1 | 7/2006 | Aust | |
| 2008/0005249 A1 | 1/2008 | Hart | |
| 2008/0005354 A1 | 1/2008 | Kryskow et al. | |
| 2008/0049714 A1 | 2/2008 | Commarford | |
| 2009/0282169 A1 | 11/2009 | Kumar et al. | |
| 2009/0300169 A1* | 12/2009 | Sagar et al. | 709/224 |
| 2009/0307336 A1 | 12/2009 | Hieb | |
| 2009/0307696 A1 | 12/2009 | Vals et al. | |
| 2010/0121874 A1* | 5/2010 | Palay et al. | 707/769 |
| 2010/0228768 A1* | 9/2010 | Yamasuge et al. | 707/769 |
| 2010/0235431 A1* | 9/2010 | Poluri et al. | 709/203 |
| 2011/0131321 A1 | 6/2011 | Black et al. | |
| 2012/0030378 A1* | 2/2012 | Kaila et al. | 709/248 |
| 2012/0102139 A1 | 4/2012 | Tran et al. | |
| 2012/0149352 A1* | 6/2012 | Backholm et al. | 455/418 |
| 2012/0173993 A1 | 7/2012 | Chakra et al. | |
| 2012/0179896 A1 | 7/2012 | Salapura et al. | |
| 2012/0221651 A1 | 8/2012 | Rabii | |
| 2012/0233463 A1* | 9/2012 | Holt et al. | 713/168 |
| 2013/0013948 A1 | 1/2013 | Sengupta et al. | |
| 2013/0060841 A1* | 3/2013 | Knight et al. | 709/203 |
| 2013/0198403 A1* | 8/2013 | Ward | 709/231 |
| 2013/0205001 A1 | 8/2013 | Reed et al. | |
| 2013/0212198 A1 | 8/2013 | Lin | |
| 2014/0092757 A1 | 4/2014 | Xu et al. | |
| 2014/0095624 A1 | 4/2014 | Quan | |
| 2014/0289189 A1* | 9/2014 | Chan et al. | 707/610 |

FOREIGN PATENT DOCUMENTS

| | | |
|---|---|---|
| EP | 2461536 | 6/2012 |
| WO | 2008022973 A1 | 2/2008 |

OTHER PUBLICATIONS

Vanturennout et al, "Adaptive Data Synchronization", U.S. Appl. No. 13/788,684, filed Mar. 7, 2013, 25 pages.

"International Search Report and Written Opinion Issued in PCT Patent Application No. PCT/US2014/060211", Mailed Date: Feb. 4, 2015, 15 Pages.

"Second Written Opinion Issued in PCT Application No. PCT/US2014/060211", Mailed Date: Aug. 25, 2015, 6 Pages.

"International Preliminary Report on Patentability Issued in PCT Application No. PCT/US2014/060211", Mailed Date: Jan. 25, 2016, 10 Pages.

"International Search Report & Written Opinion for PCT Application No. PCT/US2014/020059", Mailed Date: Jun. 4, 2014, Filed Date: Mar. 4, 2014, 9 Pages.

Office Action issued in U.S. Appl. No. 13/788,684, on Apr. 7, 2015, 11 pages.

"Second Written Opinion Issued in PCT Application No. PCT/US2014/020059", Mailed Date: Jul. 20, 2015, 6 Pages.

Office Action issued in U.S. Appl. No. 13/788,684, on Sep. 24, 2015, 10 pages.

International Preliminary Report on Patentability Issued in PCT Application No. PCT/US2014/020059, Mailed Date: Oct. 16, 2015, 7 Pages.

Office Action issued in U.S. Appl. No. 13/788,684, on Apr. 21, 2016, 13 pages.

Notice of Allowance issued in U.S. Appl. No. 13/788,684, on Aug. 9, 2016, 15 pages.

* cited by examiner

| ITEM 502 | CONTAINER 504 | ITEM PRIORITY 506 | ITEM PERIOD 508 |
| --- | --- | --- | --- |
|  | CONTAINER 504 | | |
|  | CONTAINER 504 | | |

Figure 5b
550

| CONTAINER 504 | ITEM 502 | CONTAINER PRIORITY 552 | CONTAINER PERIOD 554 |
| --- | --- | --- | --- |
|  | ITEM 502 | | |
|  | ITEM 502 | | |

700

DATA CLASSIFICATION FOR ADAPTIVE SYNCHRONIZATION

BACKGROUND

As more users start utilizing cloud services to store data that is continually updated over time, the stored data may be synchronized over multiple devices. A user may be using a smart phone, a tablet device, a laptop computer, a desktop computer, or other computing devices. Each of these devices may operate in changing circumstances, such as power level, activity level, network connection, and other factors. The user may seek synchronization of data regardless of these changes in operating conditions.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to adjusting a synchronization scheme based on the implicit data classification of a data item. A synchronization engine may detect a user action executed by a user on a data item. The synchronization engine may determine an action type for the user action. The synchronization engine may assign an item synchronization priority to the data item based on the action type.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 5a-b illustrate, in block diagrams, embodiments of a synchronization priority record.

Figure 6:
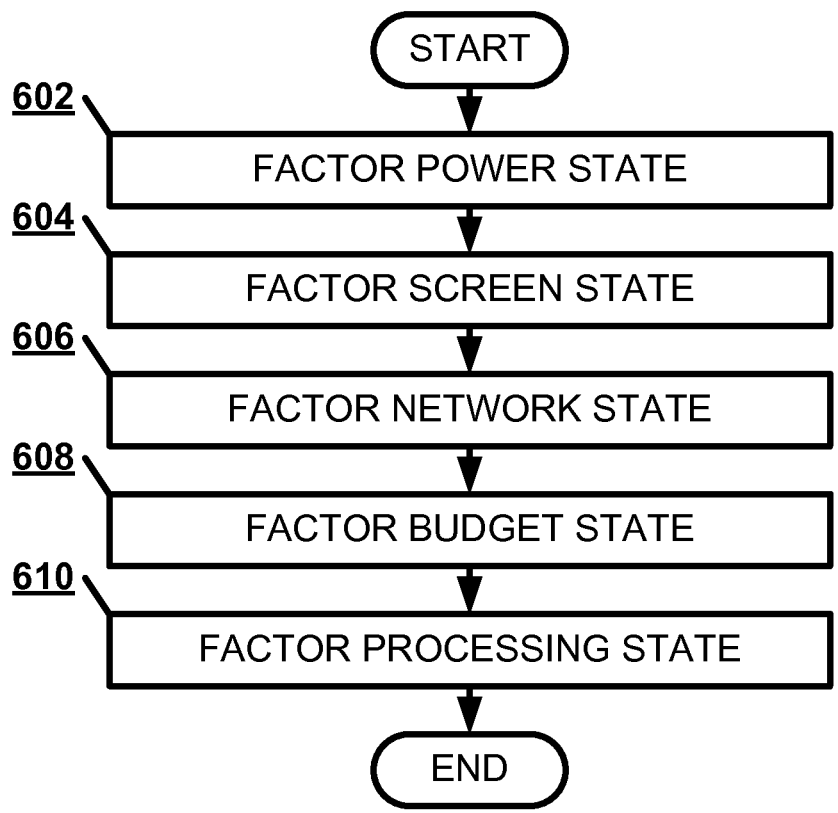

FIG. 6 illustrates, in a flowchart, one embodiment of a method of determining an operational state of the computing device with the operating system.

Figure 7:
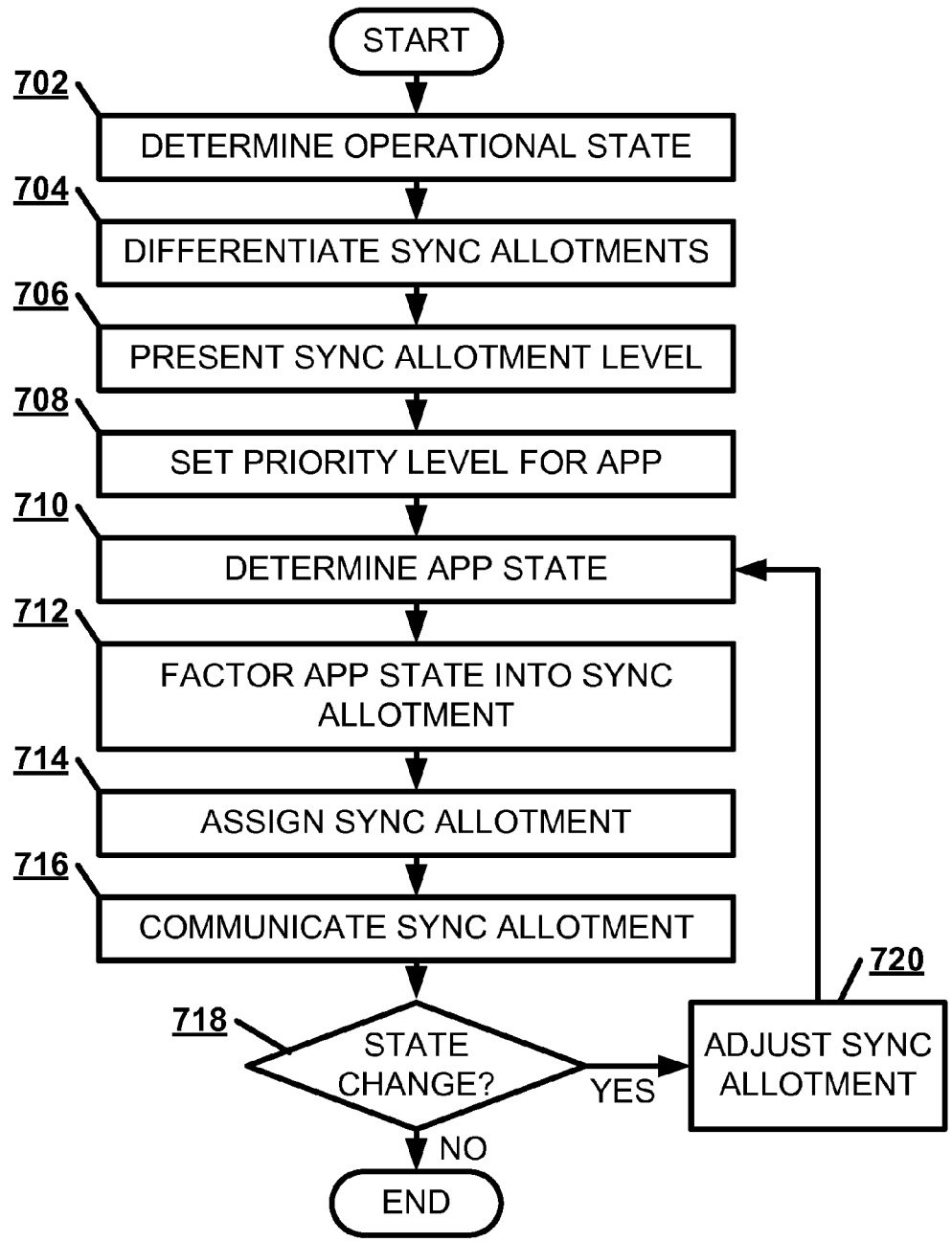

FIG. 7 illustrates, in a flowchart, one embodiment of a method of setting a synchronization allotment for an application module.

Figure 8:
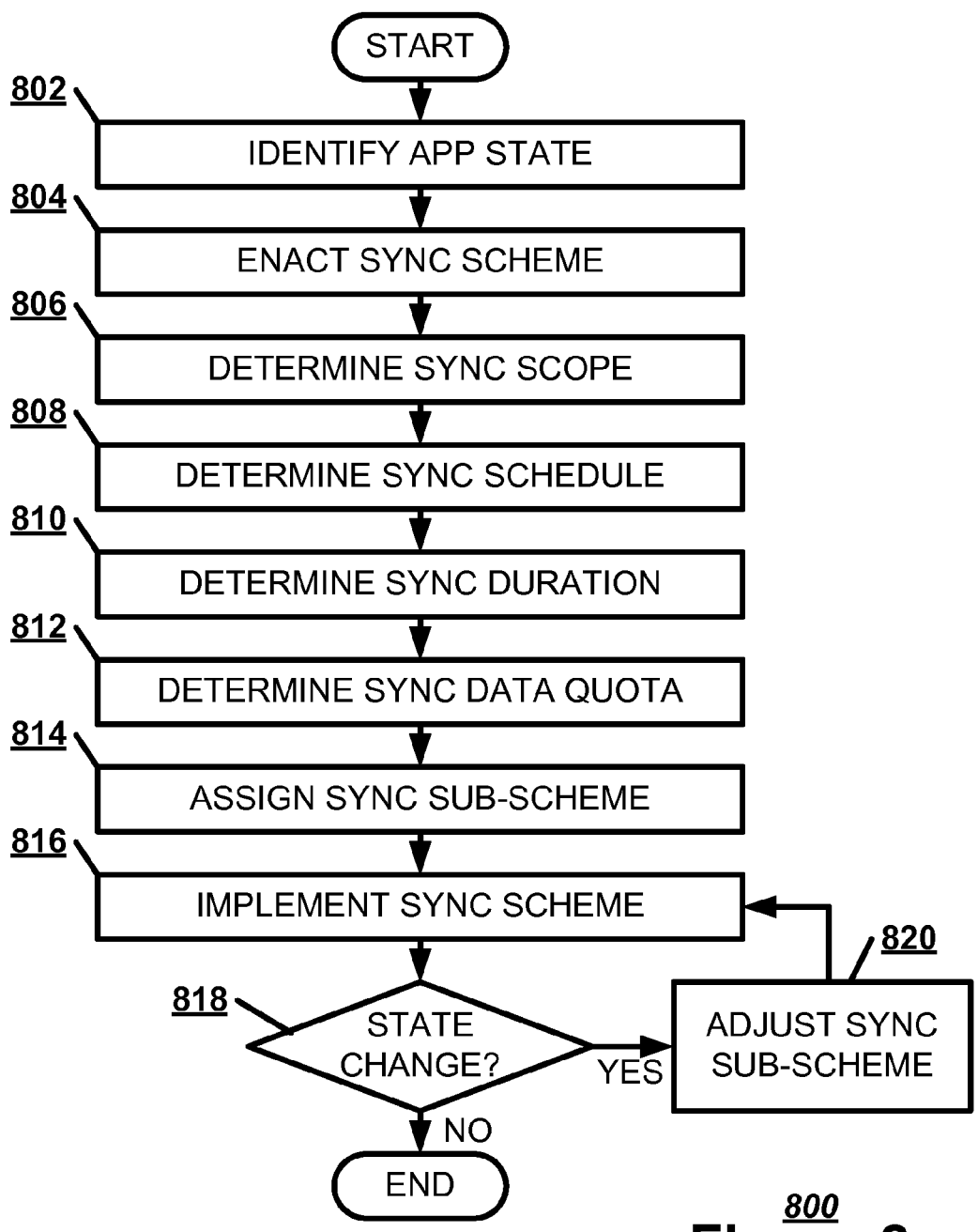

FIG. 8 illustrates, in a flowchart, one embodiment of a method of determining a synchronization scheme for an application module.

Figure 9:
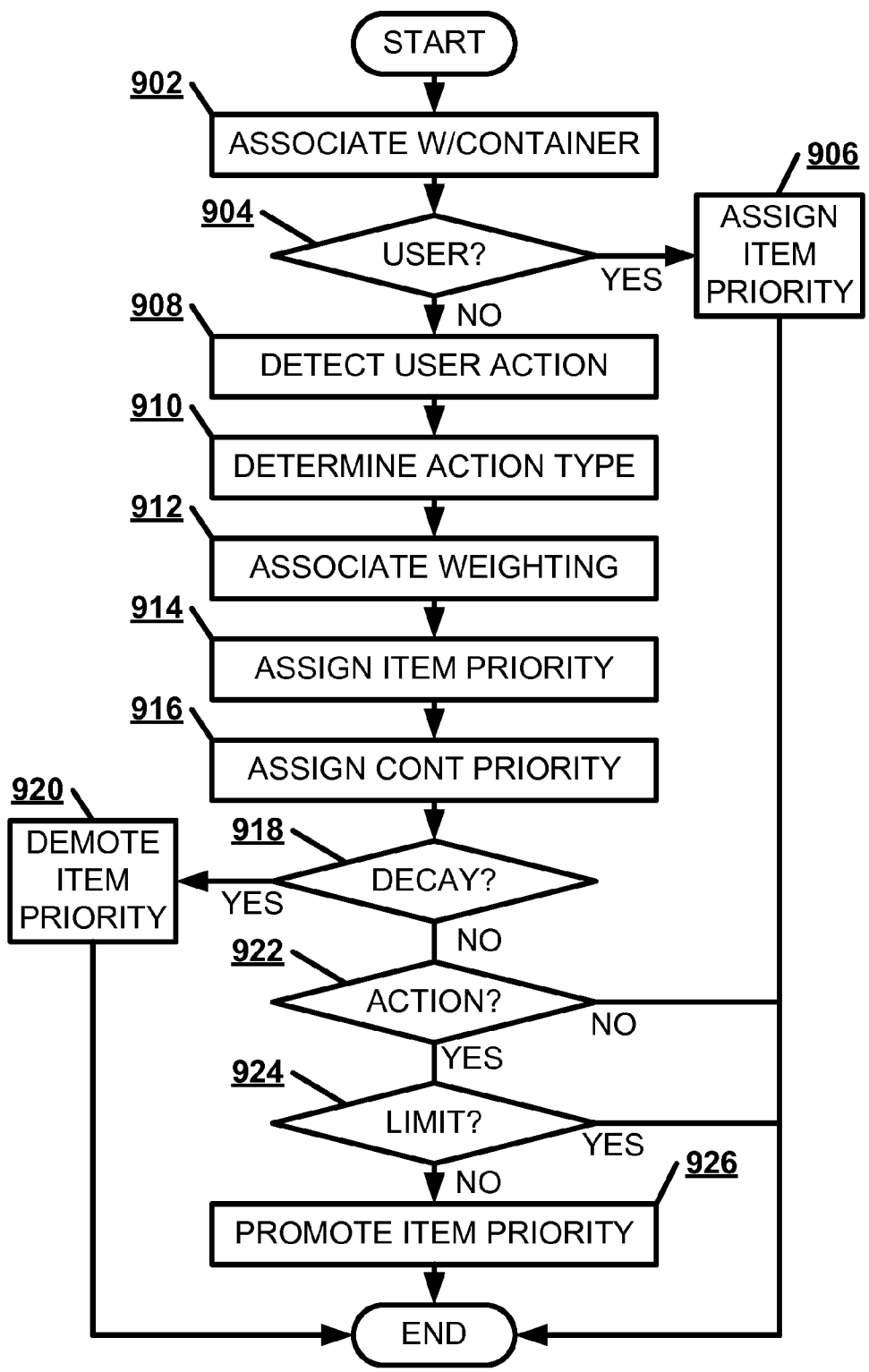

FIG. 9 illustrates, in a flowchart, one embodiment of a method of establishing a synchronization scheme with a synchronization server.

Figure 10:
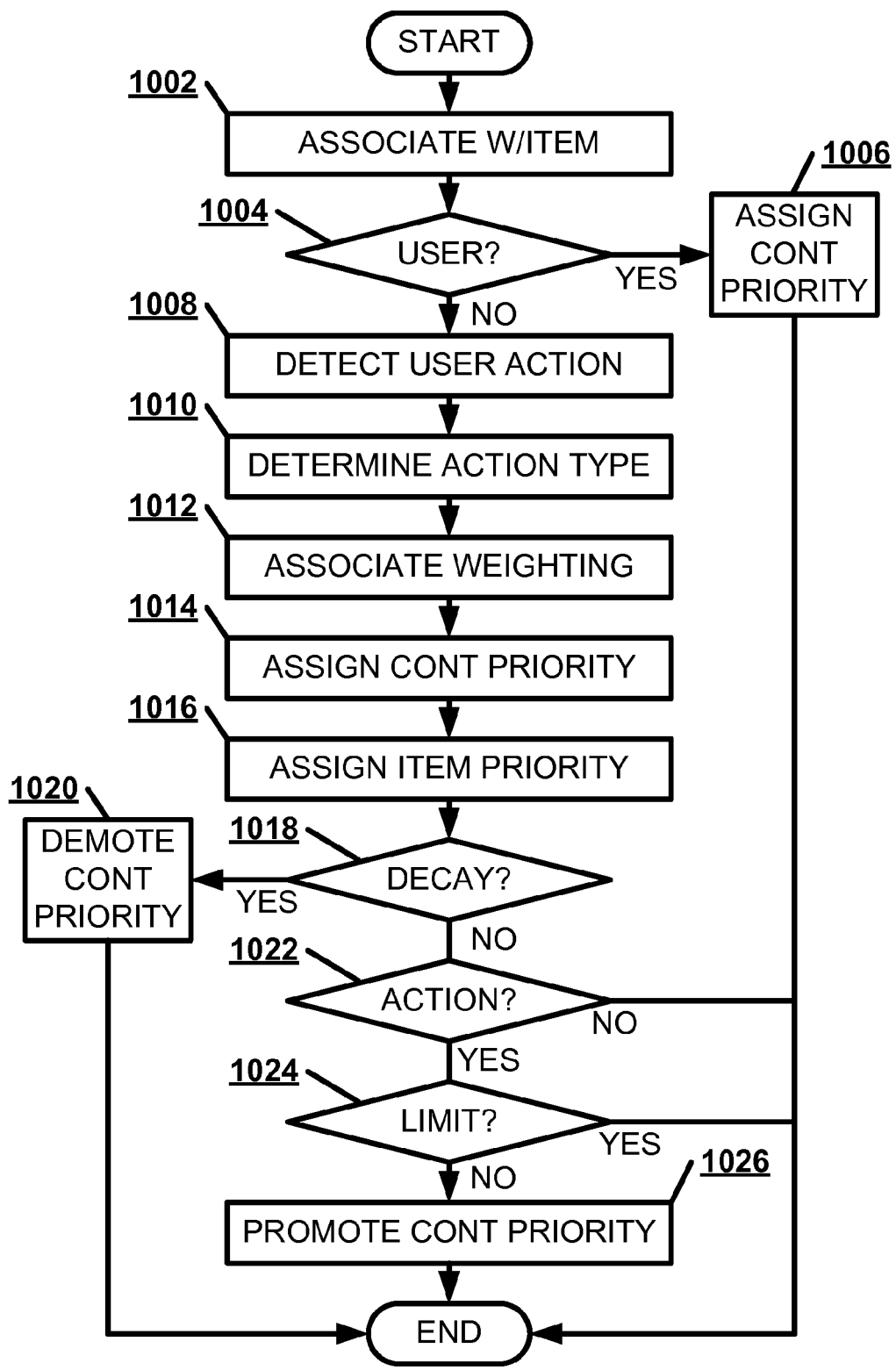

FIG. 10 illustrates, in a flowchart, one embodiment of a method of establishing an item synchronization priority for a data item.

Figure 11:
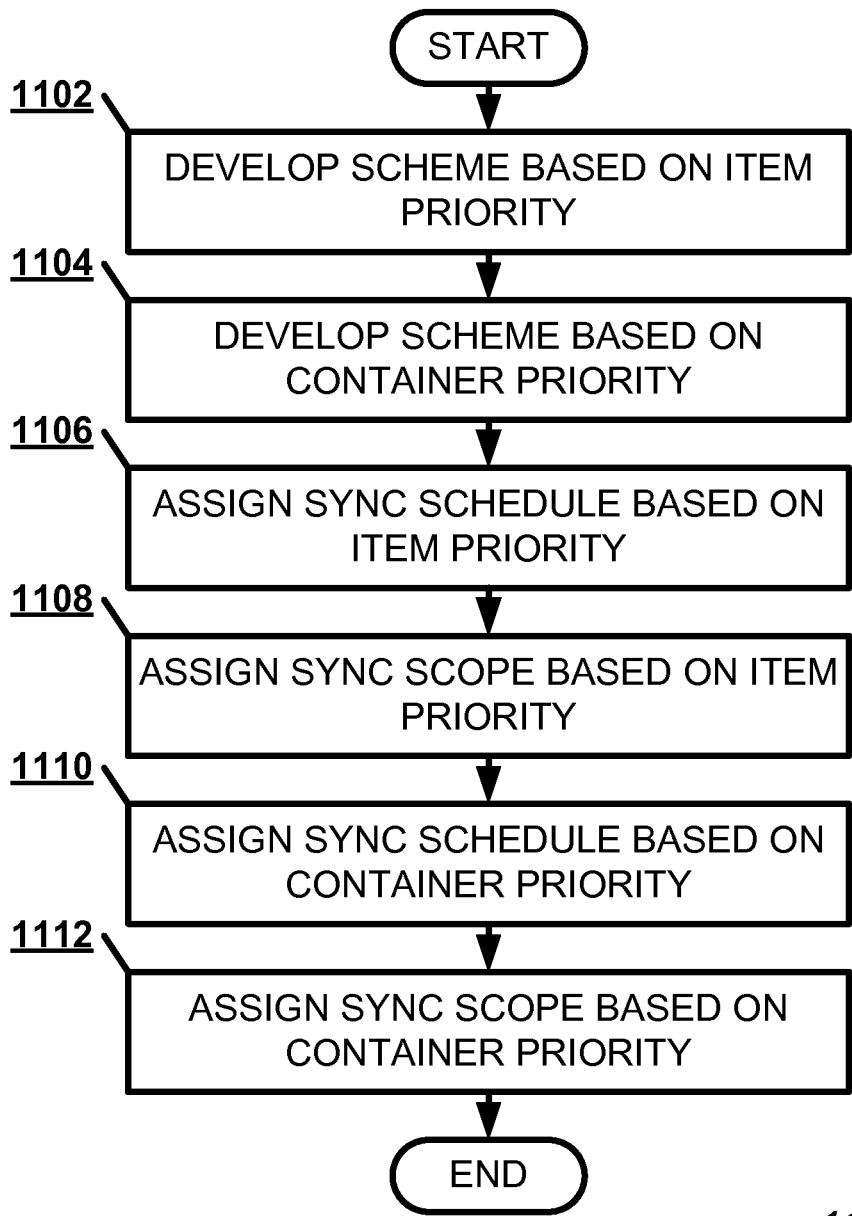

FIG. 11 illustrates, in a flowchart, one embodiment of a method of establishing a container synchronization priority for a data container.

Figure 12:
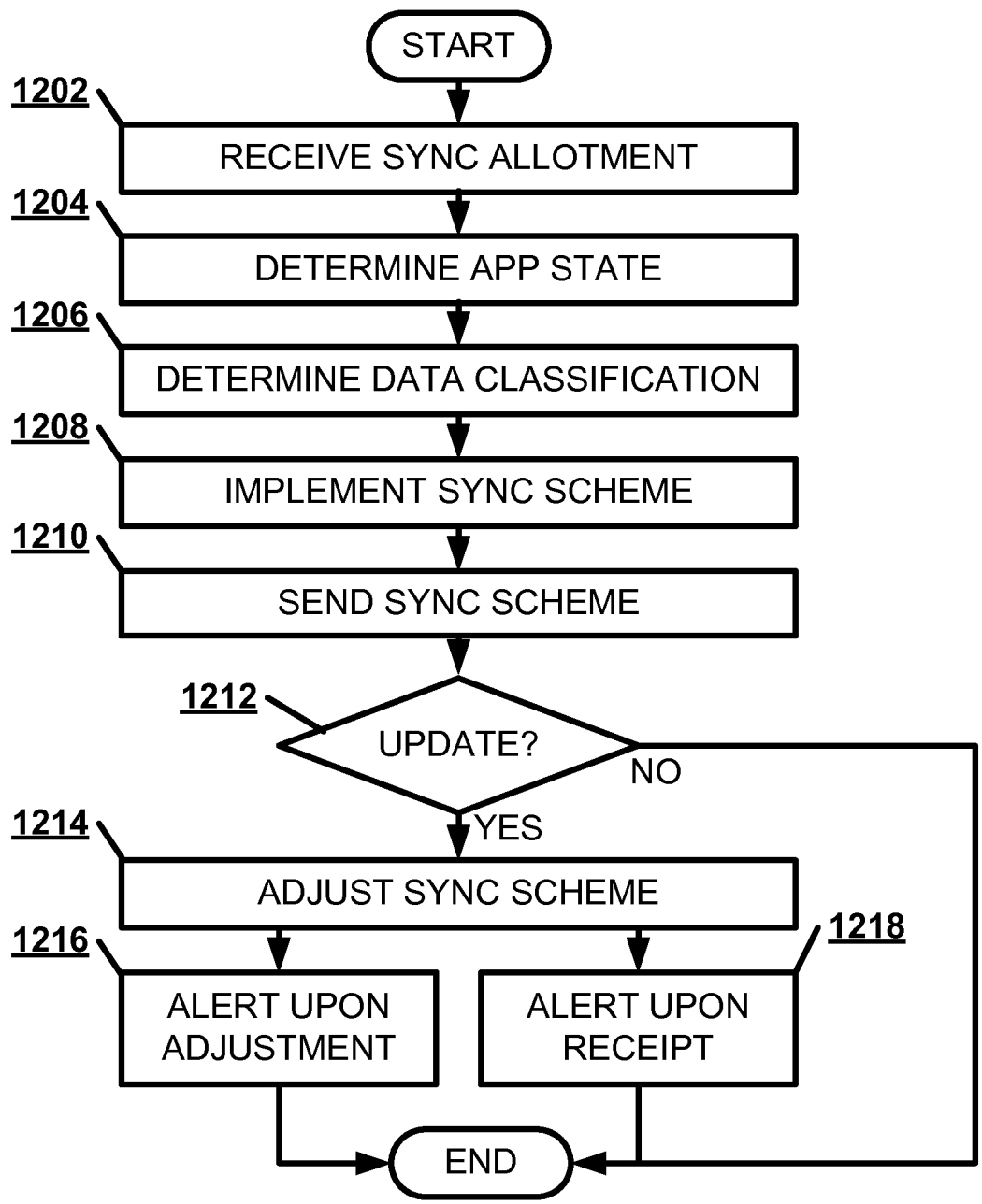

FIG. 12 illustrates, in a flowchart, one embodiment of a method of creating a synchronization scheme based on a data classification.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a synchronization manager for a computing device.

By using a holistic approach to data synchronization, data may be shared across multiple devices in an efficient manner. A holistic data synchronization program may factor both device conditions and the desires of the user to synchronize an optimal amount of data, as well as an optimal set of data. The data synchronization program may use device conditions to provide a synchronization allotment to a synchronization engine based on device conditions. The synchronization engine may then use a data classification system to efficiently apply that synchronization allotment in a pattern closest to the desires of the user.

Data synchronization programs have traditionally not adapted behavior based on different device form factors and code execution costs, potentially negatively impacting the user experience. Data synchronization implementations may tend to be device specific. If a data synchronization implementation spans multiple device types, that implementation may be designed to work on the least resource robust platform. By focusing the implementation on the lowest common denominator, the user may be cheated out of a richer user experience.

A data synchronization implementation may execute tasks using computing resources, such as processing, storage, and network capabilities. Each resource may impact battery life and network bandwidth. Additionally, the resource availability of computing device may change over time. Adapting sync behavior according to an overall cost impact may allow for a single synchronization implementation to scale across device types and operating conditions, providing users the best available experience both with respect to functionality and resource usage.

An operating system may map various operational state factors into a synchronization allotment of synchronization resources, allowing an application to use a limited set of synchronization resources. A state module of an operating system may use various algorithms for determining the operational state of executing code based on various inputs which affect that operational state, such as power, network connection, processor usage, and other operating conditions. Each operational state factor may be classified into levels. For example, a power state may be described as low cost when plugged into a power grid, medium cost when on battery power with the screen on, and high cost when on battery power with the screen off. The operating system may differentiate between application modules, assigning different synchronization allotments to different application modules.

Defining an operational state at the operating system level may allow an application to determine the optimal synchronization approach based on the available resources. Centralizing the resource determination at the operating system may free the application from having to be aware of the actions of other applications. Centralizing the resource determination also may free the application from tracking the resources and characteristics to determine the operational state.

Once the application has received a synchronization allotment from the operating system, the application may then select a synchronization scheme that optimally uses the available synchronization resources. The synchronization scheme describes the procedures to be followed by the synchronization engine to scale a synchronization protocol based on the allotment during synchronization, such as the timing of synchronizations, frequency of synchronizations, scope of synchronizations, and duration of synchronizations. The synchronization engine may implement the synchronization scheme without affecting the underlying synchronization protocol. A synchronization protocol is a set of networking rules used for synchronization of an application, such as Internet Message Access Protocol (IMAP), Exchange ActiveSync (EAS) or Post Office Protocol, version 3 (POP3). An application may determine the scope of the data to be synchronized more frequently, the scope of the notifications, or the frequency and duration of the synchronization sessions. For example, a business communication software may synchronize a calendar module and a mail module frequently while synchronizing a contacts list less often. Various mail folders within a mail module may be synchronized more frequently than others.

Further, the synchronization engine of the application may adjust the synchronization scheme based on the data load used by the synchronization. For example, if the computing device is on a priced network with a high cost for data traffic, the synchronization engine may delay large data synchronizations until a connection is made with a cheaper network. A tablet may use a limited synchronization while mobile and connected to a cellular data network, then provide a richer synchronization when connected to the user's local area network while plugged into the power grid.

The application may adjust to changes in the device operational state. The operating system may monitor the device operational state and adjust the synchronization allotment of the application as circumstances change. The application may then adjust the synchronization schemes accordingly. Further, the application and the operating system may both monitor the application state, determining whether an application is under active use, executed in the background, or dormant. As the application state changes, the synchronization allotment and synchronization scheme may be altered.

The synchronization engine may further factor a data classification scheme for the data being synchronized into a synchronization scheme. The application module may control one or more data items to be synchronized, such as a data file, a document, digital image, a digital video file, an audio file, an e-mail, a calendar event, a contact, or an executable. The application module may group the data items into one or more data containers, with each data container describing a classification feature for the data item. The synchronization engine may apply a synchronization priority to each data item or each data container based on various criteria. The synchronization priority for a data item may affect the synchronization priority for an associated data container, and vice versa.

A user may explicitly apply a synchronization priority to the data item by selecting the data item for synchronization. Alternately, the user may explicitly designate the data item as a favored data item, which implicitly indicates a high synchronization priority for the data item.

If the user has not explicitly applied a synchronization priority to the data item or explicitly designate the data item as a favored data item, the synchronization engine may implicitly determine a synchronization priority based on a user action executed on a data item. The synchronization engine may synchronize the most recently accessed data file or data container. The synchronization engine may apply a synchronization priority to a data item based on the type of user action that the user has most recently executed upon the data item. Each action type may have a specific priority weighting, allowing each action to be aggregated, with further weightings added across data containers holding the data item. The higher a synchronization priority, the more frequent the synchronization of data item, or the richer the scope of the synchronization.

Over time, the synchronization engine may promote or demote a synchronization priority for a data item. An explicit synchronization priority designation or certain active action types may cause a rapid promotion of the synchronization priority of the data item. If a decay period passes without any further user actions or with user actions having low weighted action types, the synchronization engine may demote the synchronization priority for a data item. Different priority levels may have different decay periods. For example, lower synchronization priorities may have shorter decay periods, accelerating the demotion process. If the user performs sufficient user actions of a sufficient action type to reach a minimum bar for the next synchronization priority level, the synchronization engine may promote the data item to the next synchronization priority level. Further, the number of data items at a synchronization priority level may be constrained by an item limit to prevent overcrowding of that synchronization priority level. The promotion of a data item may be contingent on availability at the next synchronization priority level.

Thus, in one embodiment, a synchronization engine of an application module may adjust a synchronization scheme based on the implicit data classification of a data item. A synchronization engine may detect a user action executed by a user on a data item. The synchronization engine may determine an action type for the user action. The synchronization engine may assign an item synchronization priority to the data item based on the action type.

Figure 1:
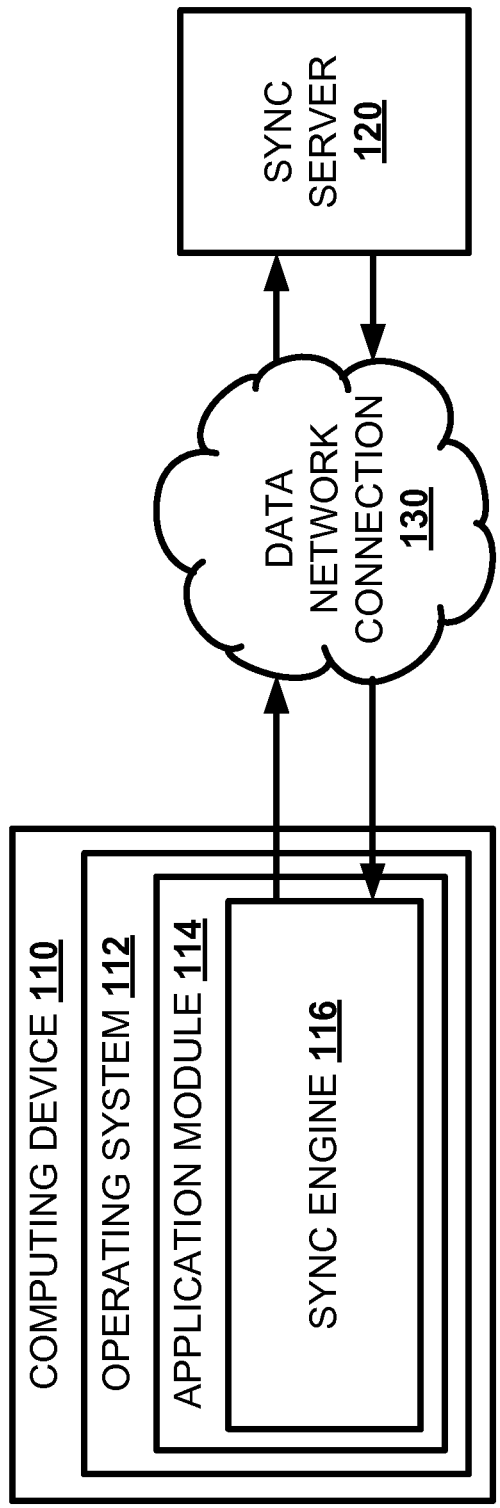
FIG. 1 illustrates, in a block diagram, one embodiment of a data network.

FIG. 1 illustrates, in a block diagram, one embodiment of a data network 100. A computing device 110 may execute an operating system 112. An operating system 112 is a set of software applications that manage the use of hardware resources by an application module 114, as well as interactions between application modules 114. An application module 114 is a software application, or an aspect of a software application.

The application module 114 may manage a local set of data for the user that may be synchronized with a remote set of data stored on the cloud. The application module 114 may have a synchronization engine (sync engine) 116 that synchronizes the local data set with the cloud data set. The synchronization engine 116 may connect to a synchronization server (sync server) 120 via a data network connection 130. The synchronization server 120 may refer to a single server or a distributed set of servers that may access the cloud data set. Alternately, a peer in a peer-to-peer network may perform the synchronization functions of the synchronization server 120 with the computing device 110. The data network connection 130 may be an internet connection, a wide area network connection, a local area network connection, or other type of data network connections. The synchronization engine 116 may alert the synchronization server to any adjustments to the synchronization scheme or receive any synchronizations over the data network connection 130.

Figure 2:
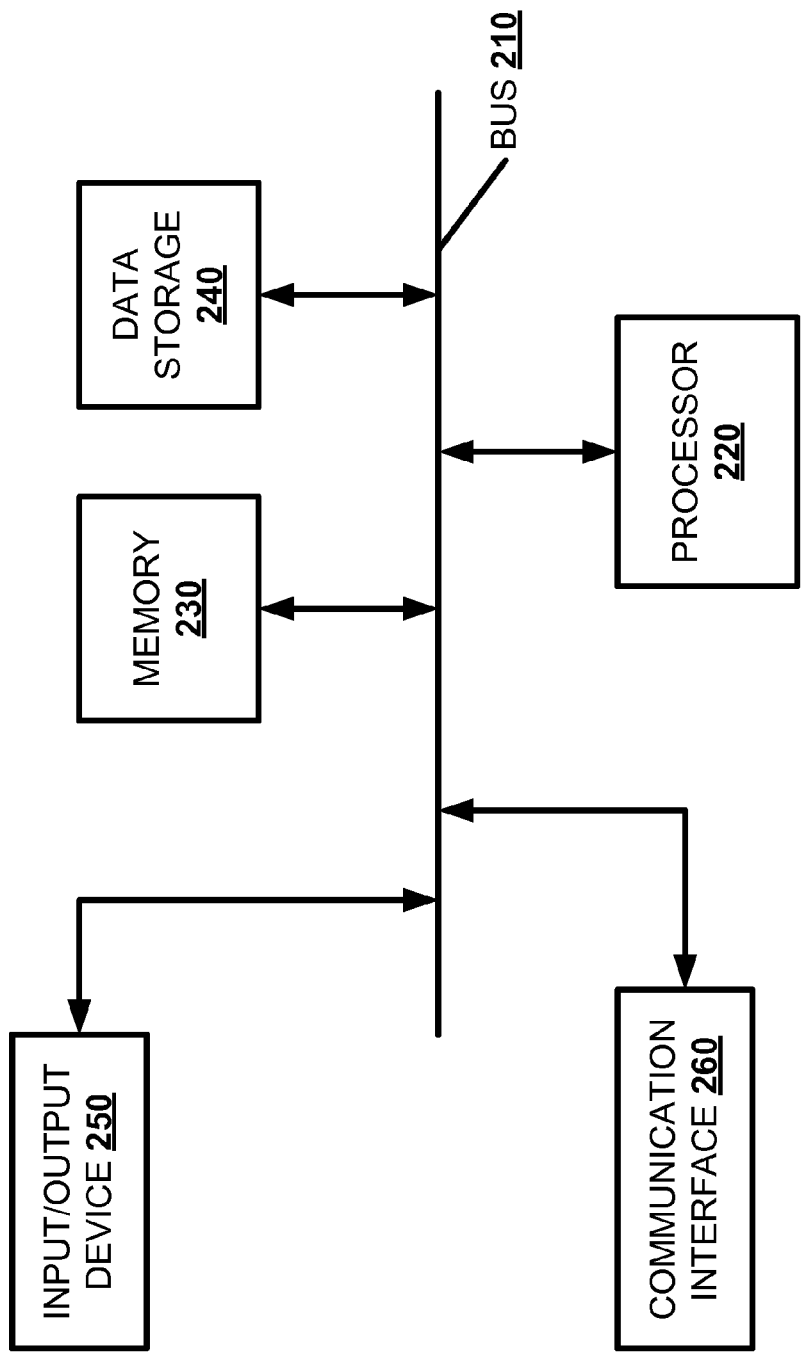
FIG. 2 illustrates, in a block diagram, one embodiment of a computing device.

FIG. 2 illustrates a block diagram of an exemplary computing device 200 which may act as a synchronization manager. The computing device 200 may combine one or more of hardware, software, firmware, and system-on-a-chip technology to implement a synchronization manager. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
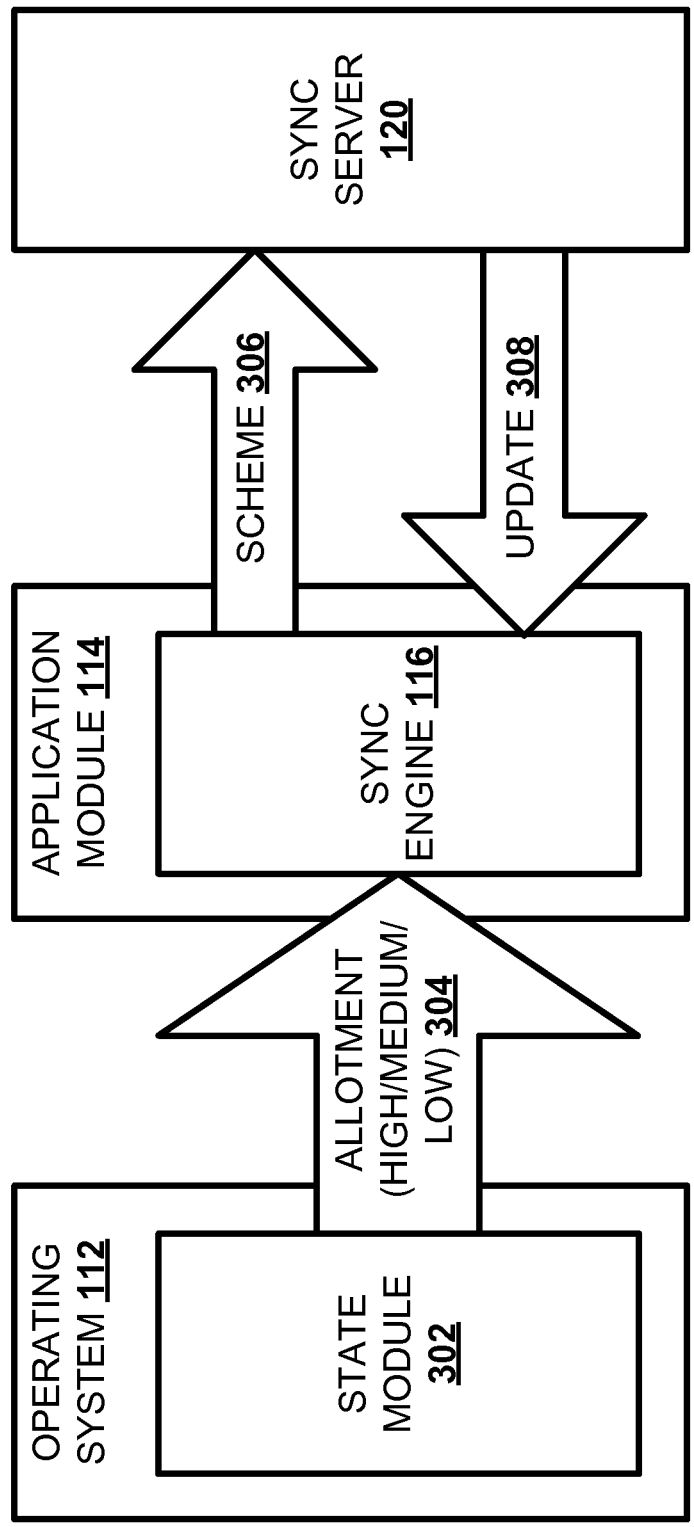
FIG. 3 illustrates, in a block diagram, one embodiment of a software architecture for the computing device.

FIG. 3 illustrates, in a block diagram, one embodiment of a software architecture 300 for the computing device 110. An operating system 112 may have a state module 302 that determines an operational state for a computing device 110. The operational state may factor in a power state, a screen state, a network state, a budget state, a processing state, or other operational descriptors of the computing device 110. A power state describes the source of power for the computing device 110, such as a power grid or a battery. The screen state describes the brightness level of the display screen for the computing device 110, such as high, low, or off. A network state describes the connectivity of the computing device 110 to a data network, as well as the type of network. A budget state describes if any of the resources of the computing device 110 is budgeted, such as a battery budget or a network budget. A processing state describes the usage of the processing power of the computing device 110.

The state module 302 may send a synchronization allotment 304 to the application module 114. The synchronization allotment 304 alerts the application module 114 as to the amount of synchronization resources available for use by an application module 114. The synchronization allotment 304 may be presented as a gradient or as a packetized set of levels, such as high level allotment, a medium level allotment, or a low level allotment. The synchronization engine 116 may communicate with the state module 302 to adjust the synchronization allotments 304 between application modules 114 based on a data classification for each data item controlled by the application module 114.

The synchronization engine 116 of the application module 114 may then develop or adjust a synchronization scheme 306 based on the synchronization allotment 304 and the data classifications. The synchronization scheme 306 describes the rules for synchronizing the local data set with the cloud data set. The synchronization scheme 306 may describe a synchronization scope, a synchronization schedule, a synchronization duration, a synchronization data quota, and other metrics. A synchronization scope may describe specific sub-modules that are to be synchronized during a synchronization session, such as whether a synchronized e-mail includes any attachments. A synchronization schedule may describe the timing and frequency of synchronization. The synchronization duration describes the length of time for a synchronization session. The synchronization data quota describes the amount of data sent during a synchronization session. The synchronization server 120 may send a synchronization update 308 to the synchronization engine based on the synchronization scheme 306 provided by the synchronization engine 116.

Figure 4:
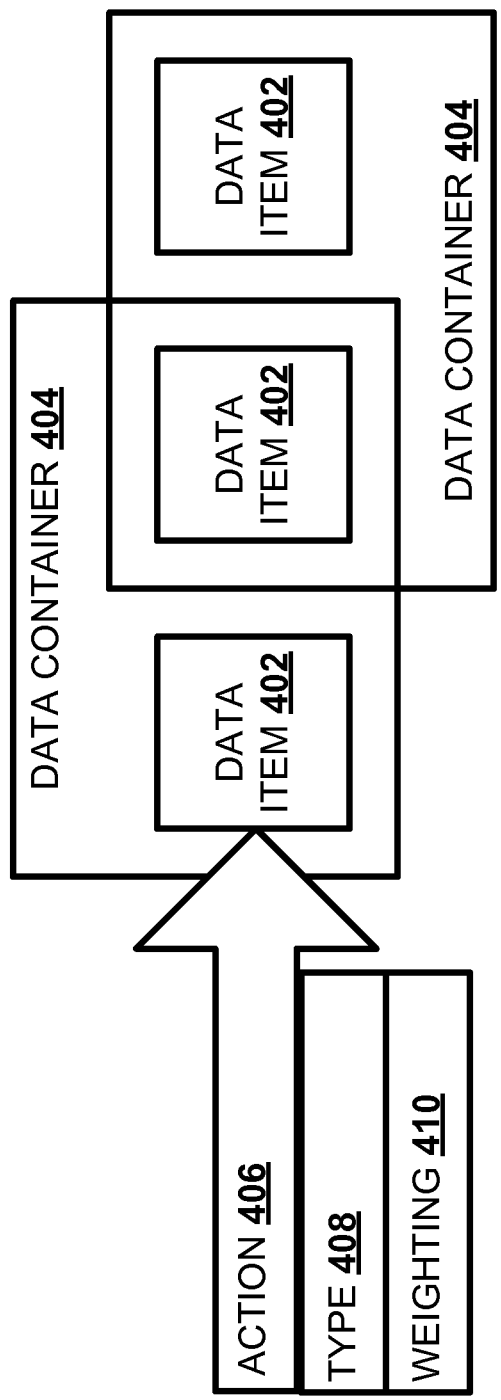
FIG. 4 illustrates, in a block diagram, one embodiment of a data management system.

FIG. 4 illustrates, in a block diagram, one embodiment of a data management system 400 that the synchronization engine 116 may use to classify the proprietary data of the application module 114. An application module 114 may manage, edit, or control a set of one or more data items 402. A data item 402 is a data object processed by the application module 114, such as a file, a document, a digital image, a digital video file, an audio file, an e-mail, a calendar event, a contact, an executable, or other data object. A data item 402 may be controlled by multiple application modules 114.

Each data item 402 may be grouped into one or more data containers 404. A data container 404 is a classification group for the data item 402. For example, a data file is a data item 402 that may be grouped with other data files into a data container 404 such as a data folder. Alternately, an e-mail is a data item 402 that may be grouped in a data container 404 representing the sender of the e-mail, while in a different data container 404 representing the subject matter of the e-mail.

A user may use the application module 114 to execute a user action 406 on a data item 402 or on a data container 404. Each user action 406 may have an action type 408 describing the user action 406, particularly describing the level of user involvement in the user action 406. For example, reading an e-mail may be considered a passive action type 408, replying to an e-mail may be considered an active action type 408, and deleting an e-mail may be considered a negative action type 408. The synchronization engine 116 may assign each action type 408 a priority weighting 410. The priority weighting 410 of the user action 406 may alter the synchronization priority of the data item 402 or the data container 404 that is the target of the user action 406.

The synchronization engine may maintain a synchronization record to track the synchronization priority of the data item 402 or the data container 404. FIG. 5a, illustrates in a block diagram, one embodiment of an item synchronization priority record 500. An item synchronization priority record 500 may have a data item field 502 identifying the data item 402 that the item synchronization priority record 500 represents. The item synchronization priority record 500 may have a data container field 504 identifying the data containers 404 associated with the data item 402. The item synchronization priority record 500 may have an item synchronization priority field 506 describing the item synchronization priority of the data item 402. The item synchronization priority may be used to determine both the scope and frequency of synchronizations for a data item 402. A data item 402 with a higher synchronization priority may be synchronized more frequently or with greater richness than a data item 402 with a lower synchronization priority. The item synchronization priority record 500 may have an item decay period field 508 describing the amount of time without being targeted by a user action 406 before the item synchronization priority for the data item 402 is demoted to a lower item synchronization priority.

FIG. 5b, illustrates in a block diagram, one embodiment of a container synchronization priority record 550. A container synchronization priority record 550 may have a data container field 504 identifying the data container 404 that the container synchronization priority record 550 represents. The container synchronization priority record 550 may have a data item field 502 identifying the data items 402 associated with the data container 404. The container synchronization priority record 550 may have a container synchronization priority field 552 describing the container synchronization priority of the data container 404. The container synchronization priority may be used to determine both the scope and frequency of synchronizations for a data container 404. A data item 402 in a data container 404 with a higher synchronization priority may be synchronized more frequently or with greater richness than a data item 402 in a data container 404 with a lower synchronization priority. The container synchronization priority record 550 may have a container decay period field 554 describing the amount of time without being targeted by a user action 406 before the container synchronization priority for the data container 404 is demoted to a lower container synchronization priority.

FIG. 6 illustrates, in a flowchart, one embodiment of a method 600 of determining an operational state of the computing device 110 with the operating system 112. The state module 302 of the operating system 112 may factor a power state into the operational state (Block 602). The state module 302 may factor a screen state into the operational state (Block 604). The state module 302 may factor a network state into the screen state (Block 606). The state module 302 may factor a budget state into the operational state (Block 608). The state module 302 may factor a processing state into the operational state (Block 610).

FIG. 7 illustrates, in a flowchart, one embodiment of a method 700 of setting a synchronization allotment 304 for an application module 114. The operating system 112 may determine an operational state for a computing device 110 (Block 702). The operating system 112 may differentiate synchronization allotments 304 between application modules 114, such as differentiating a synchronization allotment 304 for an application module 114 from an ancillary synchronization allotment 304 for an ancillary application module 114 (Block 704). Under differentiation, an ancillary application module 114 may receive a higher or lower synchronization allotment 304 than the synchronization allotment 304 for the application module 114. The operating system 112 may present the synchronization allotment 304 as at least one of a high level allotment, a medium level allotment, or a low level allotment (Block 706). The operating system 112 may set a priority level for the application module 114, describing which application module generally receives synchronization first (Block 708). A user or a developer may set the priority level for the application module 114. Alternately, the synchronization engine 116 may base the priority level for the application module 114 on an action type 408 of a user action 406 executed on the application module 114. The operating system 112 may determine an application (APP) state for the application module 114 (Block 710). The application state describes the activity level of the application module 114, such as active, background, or dormant. The operating system 112 may factor the application state into the synchronization allotment 304 (Block 712). The operating system 112 may assign a synchronization allotment 304 to an application module 114 based on the operational state (Block 714). The operating system 112 may communicate the synchronization allotment 304 to the application module 114 (Block 716). If the state module 302 identifies a state change for the operational state (Block 718), the operating system 112 may adjust the synchronization allotment 304 based on the state change for the operational state (Block 720).

FIG. 8 illustrates, in a flowchart, one embodiment of a method 800 of implementing a synchronization scheme 306 for an application module 114. The application module 114 may identify the application state (Block 802). A synchronization engine 116 of the application module 114 may enact a synchronization scheme 306 based on a synchronization allotment 304 received from an operating system 112 (Block 804). The application module 114 may determine a synchronization scope for the synchronization engine 116 based on the synchronization allotment (Block 806). The application module 114 may determine a synchronization schedule for the synchronization engine 116 based on the synchronization allotment (Block 808). The application module 114 may determine a synchronization duration for the synchronization engine 116 based on the synchronization allotment (Block 810). The application module 114 may determine a synchronization data quota for the synchronization engine 116 based on the synchronization allotment (Block 812).

The application module 114 may assign synchronization sub-schemes for each application sub-module 114, such as assigning a primary synchronization sub-scheme for a primary application sub-module and an ancillary synchronization sub-scheme for an ancillary sub-module based on the synchronization allotment 304 (Block 814). An application sub-module is an aspect of an application module 114, such as a mail function and a calendar function for a business communication program. For example, the synchronization sub-scheme for the mail function may differ from the synchronization sub-scheme for the calendar function. The synchronization engine 116 of the application module 114 may implement the synchronization scheme 306 for the application module 114 based on the synchronization allotment (Block 816). If a change occurs to the application state of the application module 114 (Block 818), the application module 114 may adjust the primary synchronization sub-scheme and the ancillary synchronization sub-scheme based on a change to the application state to reflect the new application state (Block 820).

FIG. 9 illustrates, in a flowchart, one embodiment of a method 900 of establishing an item synchronization priority for a data item 402. The synchronization engine 116 may associate the data item 402 with a data container 404 (Block 902). If the synchronization engine 116 receives an item synchronization priority designation from the user for the data item 402 (Block 904), the synchronization engine 116 may assign the designated item synchronization priority to the data item 402 (Block 906). The synchronization engine 116 may detect a user action 406 executed by a user on the data item 402 (Block 908). The synchronization engine 116 determine an action type 408 for the user action 406 (Block 910). The synchronization engine 116 may associate a priority weighting 410 with the action type 408 (Block 912). The synchronization engine 116 may assign an item synchronization priority to the data item 402 based on the action type 408 (Block 914). The synchronization engine 116 may assign a container (CONT) synchronization priority to a data container 404 associated with the data item 402 based on the item synchronization priority (Block 916). If an item decay period is reached without sufficient subsequent user actions 406 to reach a minimum priority bar (Block 918), the synchronization engine 116 may demote the item synchronization priority for the data item 402 after the item decay period (Block 920). Otherwise, if the user has executed sufficient subsequent user actions 406 of a sufficient action type 408 on the data item 402 (Block 922) and the synchronization engine 116 determines that a next item synchronization priority level has not reached an item limit (Block 924), the synchronization engine 116 may promote the item synchronization priority for the data item 402 after a subsequent user action 406 (Block 926). Each item synchronization priority level may have an item limit describing the maximum number of data items that may be assigned that item synchronization priority level.

FIG. 10 illustrates, in a flowchart, one embodiment of a method 1000 of establishing a container synchronization priority for a data container 404. The synchronization engine 116 may associate the data container 404 with a data item 402 (Block 1002). If the synchronization engine 116 receives a container synchronization priority designation from the user for the data container 404 (Block 1004), the synchronization engine 116 may assign the designated container synchronization priority to the data container 404 (Block 1006). The synchronization engine 116 may alter the item synchronization priority for any data items 402 associated with the data container 404 based on the container synchronization priority designation. The type of data container 404 may affect the amount of affect a user action 406 on the data container 404 has on the item synchronization priority for an associated data item 402. The synchronization engine 116 may detect a user action 406 executed by a user on the data container 404 (Block 1008). The synchronization engine 116 determine an action type 408 for the user action 406 (Block 1010). The synchronization engine 116 may associate a priority weighting 410 with the action type 408 (Block 1012). The synchronization engine 116 may assign a container synchronization priority to the data container 404 based on the action type 408 (Block 1014). The synchronization engine 116 may assign an item synchronization priority to a data item 402 associated with the data container 404 based on the container synchronization priority (Block 1016). If an item decay period is reached without sufficient subsequent user actions 406 to reach a minimum priority bar (Block 1018), the synchronization engine 116 may demote the container synchronization priority for the data container 404 after the item decay period (Block 1020). Otherwise, if the user has executed sufficient subsequent user actions 406 of a sufficient action type 408 on the data container 404 (Block 1022) and the synchronization engine 116 determines that a next container synchronization priority level has not reached a container limit (Block 1024), the synchronization engine 116 may promote the container synchronization priority for the data container 404 after a subsequent user action 406 (Block 1026). Each container synchronization priority level may have a container limit describing the maximum number of data containers that may be assigned that container synchronization priority level.

FIG. 11 illustrates, in a flowchart, one embodiment of a method 1100 of creating a synchronization scheme 306 based on a data classification of data items 402 and data containers 404 controlled by an application module 114. The synchronization engine 116 may develop a synchronization scheme 306 based on the item synchronization priority (Block 1102). The synchronization engine 116 may develop a synchronization scheme 306 based on the container synchronization priority (Block 1104). The synchronization engine 116 may assign a synchronization schedule based on the item synchronization priority (Block 1106). The synchronization engine 116 may assign a synchronization scope based on the item synchronization priority (Block 1108). The synchronization engine 116 may assign a synchronization schedule based on the container synchronization priority (Block 1110). The synchronization engine 116 may assign a synchronization scope based on the container synchronization priority (Block 1112).

FIG. 12 illustrates, in a flowchart, one embodiment of a method 1200 of establishing a synchronization scheme 306 with a synchronization server 120. The application module 114 may receive from an operating system 112 a synchronization allotment 304 based on an operation state of a computing device 110 (Block 1202). The application module 114 may determine an application state for the application module (Block 1204). The synchronization engine 116 of the application module 114 may determine a data classification for the data items 402 and the data containers 404 controlled by the application module 114 (Block 1206). The synchronization engine 116 of the application module 114 may implement the synchronization scheme 306 for the application module 114 based on the synchronization allotment 304 and the data classification (Block 1208). The synchronization engine 116 of the application module 114 may send the synchronization scheme 306 to the synchronization server 120 (Block 1210). If the application module 114 receives an updated synchronization allotment 304 from the operating system 112 upon a change to the operational state (Block 1212), the synchronization engine 116 of the application module 114 may adjust the synchronization scheme 306 based on the updated synchronization allotment 304 (Block 1214). The synchronization engine 116 of the application module 114 may alert the synchronization server 120 to an updated synchronization scheme 306 upon adjusting the synchronization scheme 306 (Block 1216). Alternately, the synchronization engine 116 of the application module 114 may execute a lazy synchronization scheme update, alerting the synchronization server 120 to a synchronization scheme 306 upon receiving a synchronization update 308 from the synchronization server 120 (Block 1218).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method implemented in a computing device operatively coupled to a remote server via a computer network, the method comprising:
   detecting, at the computing device, first and second user actions executed by a user in an application on first and second data items, respectively;
   determining first and second action types associated with the first and second detected user actions, respectively, the first and second action types describing first and second levels of user involvement associated with the first and second user actions, respectively, wherein the first level of user involvement is greater than the second level of user involvement;
   automatically assigning, with a synchronization engine of the computing device, first and second synchronization priorities to the first and second data items based on the first and second action types, respectively, the first synchronization priority being higher than the second synchronization priority in accordance with the first level of user involvement being greater than the second level of user involvement and
   performing synchronization of the first and second data items on the computing device with a copy of the first and second data items on the remote server via the computer network based on the assigned first and second synchronization priorities, wherein the synchronization of the first data item is more frequent than the synchronization of the second data item in accordance with the first synchronization priority being higher than the second synchronization priority.

2. The method of claim 1, further comprising:
   associating the first or second data item with a data container.

3. The method of claim 1, further comprising:
   assigning a container synchronization priority to a data container associated with the first or second data item based on the first or second synchronization priority.

4. The method of claim 1, further comprising:
   receiving a synchronization priority designation from the user for the first or second data item.

5. The method of claim 1, further comprising:
   associating a priority weighting with the first or second action type.

6. The method of claim 1, further comprising:
   demoting the first or second synchronization priority for the first or second data item, respectively, after an item decay period.

7. The method of claim 1, further comprising:
   determining that a next synchronization priority level has not reached an item limit.

8. The method of claim 1, further comprising:
   promoting the first or second synchronization priority for the first or second data item, respectively, after a subsequent user action.

9. The method of claim 1, further comprising:
   developing a synchronization scheme based on the first and second synchronization priorities.

10. The method of claim 1, further comprising:
    assigning at least one of a synchronization schedule and a synchronization scope based on the first and second synchronization priorities.

11. A computing device operatively coupled to a remote server via a computer network, the computing device having a processor and a memory containing instructions executable by the processor to cause the processor to perform a method comprising:
- detecting, at the computing device, a plurality of user actions executed by a user in an application on a plurality of data items;
- determining an action type associated with each of the detected user actions, the individual action types describing corresponding distinct levels of user involvement associated with the detected user actions;
- automatically assigning a synchronization priority to the individual data items based on the determined action types, one of the data items having a higher synchronization priority than another in accordance with the level of user involvement associated with the one of the data items being greater than that of the another; and
- performing synchronization of the data items on the computing device with a copy of the data items on the remote server via the computer network according to the assigned synchronization priorities, wherein the synchronization of the one of the data items is more frequent than the another in accordance with the synchronization priority associated with the one of the data items being higher than that of the another data item.

12. The computing device of claim 11, further comprising:
- determining a period of time since the user executed a user action on the one data item;
- determining whether the period of time exceeds an item decay period; and
- in response to determining that the period of time exceeds the item decay period, reducing the assigned synchronization priority associated with the one data item from an original level to a lower level.

13. The computing device of claim 11, further comprising:
- determining a period of time since the user executed a user action on the one data item;
- determining whether the period of time exceeds an item decay period; and
- in response to determining that the period of time does not exceed the item decay period, maintaining the assigned synchronization priority associated with the one data item at an original level.

14. The computing device of claim 11, further comprising:
- detecting an addition user action executed by the user in the application on the one data item, the additional user action having an action type describing a level of user involvement higher than that of an initial action type associated with the one data item; and
- increasing the assigned synchronization priority associated with the one data item from an original level to a higher level.

15. The computing device of claim 11 wherein:
- the action types include an active action type and a passive action type;
- the one data item is associated with the active action type;
- the another data item is associated with the passive action type; and
- automatically assigning the synchronization priority includes automatically assigning a higher level of synchronization priority to the one data item than to the another data item.

16. The computing device of claim 11 wherein:
- the action types include an active action type and a passive action type;
- the one data item is associated with the active action type;
- the another data item is associated with the passive action type; and
- automatically assigning the synchronization priority includes automatically assigning a higher level of synchronization priority to the one data item than to the another data item.

17. The computing device of claim 11 wherein:
- the one data item is contained in a data container; and
- the method further includes assigning a synchronization priority to the data container based on the detected user action on the one data item.

18. A computing device operatively coupled to a remote server via a computer network, the computing device having a processor and a memory containing instructions executable by the processor to cause the processor to perform a method comprising:
- detecting, at the computing device, a user action executed by a user in an application on a data item;
- determining an action type associated with the detected user action, the action type describing a corresponding level of user interaction with the detected user action;
- automatically assigning a synchronization priority to the data item based on the determined action type, the assigned synchronization priority being in accordance with the level of user interaction associated with the detected user action by the user on the data item; and
- performing synchronization of the data item on the computing device with a copy of the data item on the remote server via the computer network according to the assigned synchronization priority, wherein a frequency of the synchronization of the data item is set in accordance with the assigned synchronization priority associated with the data item.

19. The computing device of claim 18, further comprising:
- determining a period of time since the user executed the user action on the data item;
- determining whether the period of time exceeds a preset decay period; and
- in response to determining that the period of time exceeds the preset decay period, reducing the assigned synchronization priority associated with the data item from an original level to a lower level.

20. The computing device of claim 11 wherein:
- the detected user action is a first user action having a first action type; and
- the method further includes:
  - detecting a second user action executed by the user in the application on the data item, the second user action having a second action type describing a level of user involvement higher than that of the first action type of the first user action; and
  - in response to the detected second user action, increasing the assigned synchronization priority associated with the data item from an original level to a higher level.

* * * * *